United States Defensive Publication [19] (H) [11] T957,009

Jahn [43] Apr. 5, 1977

[54] NON-BLOCKING OXYGEN-RESISTANT VINYLIDENE CHLORIDE POLYMER COATING COMPOSITIONS

[76] Inventor: Robert G. Jahn, 2046 Sharp, Saginaw, Mich. 48602

[21] Appl. No.: 686,755

[22] Filed: May 17, 1976

[51] Int. Cl.[2] ..... B32B 27/30; B32B 27/32; B32B 5/16

[52] U.S. Cl. ..... 428/327; 428/518; 428/520; 428/522; 428/910

[57] ABSTRACT

Heat-sealable vinylidene chloride polymer coatings having improved anti-blocking tendencies while retaining resistance to oxygen transmission are obtained from aqueous dispersions of a normally crystalline vinylidene chloride polymer wherein such dispersions have incorporated therein from about 0.5 to about 5 percent based on the weight of normally crystalline vinylidene chloride polymer of a plurality of polymeric microspheres having an average diameter of between about 1 to about 5 microns, such microspheres consisting essentially of a vinylidene chloride polymer containing at least about 50 percent by weight of polymerized vinylidene chloride with any remainder of such polymer being one or more monoethylenically unsaturated comonomer.

12 Claims, No Sheets Drawing,

19 Pages Specification

The file of this unexamined application may be inspected and copies thereof may be purchased (849 O.G. 1221, Apr. 9, 1968).